(12) United States Patent
Kishon et al.

(10) Patent No.: US 11,893,801 B2
(45) Date of Patent: Feb. 6, 2024

(54) FLAGMAN TRAFFIC GESTURE RECOGNITION

(71) Applicants: GM Global Technology Operations LLC, Detroit, MI (US); Carnegie Mellon University, Pittsburgh, PA (US)

(72) Inventors: Eran Kishon, Hod Hasharon (IL); Weijing Shi, Pittsburgh, PA (US); Ragunathan Rajkumar, Monroeville, PA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 301 days.

(21) Appl. No.: 17/223,473

(22) Filed: Apr. 6, 2021

(65) Prior Publication Data

US 2022/0318560 A1 Oct. 6, 2022

(51) Int. Cl.
| | |
|---|---|
| *G06V 20/58* | (2022.01) |
| *G06N 3/04* | (2023.01) |
| *G06T 11/20* | (2006.01) |
| *G06V 40/20* | (2022.01) |
| *G06F 18/2431* | (2023.01) |
| *A23B 7/159* | (2006.01) |
| *B01D 53/04* | (2006.01) |
| *B01D 53/22* | (2006.01) |

(Continued)

(52) U.S. Cl.
CPC ............ *G06V 20/582* (2022.01); *A23B 7/159* (2013.01); *B01D 53/0415* (2013.01); *B01D 53/229* (2013.01); *B01D 53/268* (2013.01); *F25D 17/042* (2013.01); *F25D 25/025* (2013.01); *G06F 18/2431* (2023.01); *G06N 3/04* (2013.01); *G06T 11/20* (2013.01); *G06V 40/20* (2022.01); *A23V 2002/00* (2013.01); *B01D 2257/7022* (2013.01); *B01D 2257/80* (2013.01); *F25D 2317/041* (2013.01); *F25D 2325/00* (2013.01); *G06T 2210/12* (2013.01)

(58) Field of Classification Search
CPC ...... G06V 20/582; G06V 40/20; G06V 10/82; G06V 20/56; G06V 40/28; G06F 18/2431; G06N 3/04; G06N 3/044; G06T 11/20; G06T 2210/12
See application file for complete search history.

(56) References Cited

U.S. PATENT DOCUMENTS

| | | | | |
|---|---|---|---|---|
| 2017/0364759 | A1* | 12/2017 | Creusot | G08G 1/095 |
| 2018/0232663 | A1* | 8/2018 | Ross | G06N 3/045 |

OTHER PUBLICATIONS

Traffic Control Gesture Recognition, Wiederer et al, 2020 (Year: 2020).*

(Continued)

*Primary Examiner* — Jianxun Yang
(74) *Attorney, Agent, or Firm* — CANTOR COLBURN LLP

(57) ABSTRACT

A vehicle and a system and method of operating the vehicle based on a gesture made by a traffic director. The system includes a camera and at least one neural network. The camera obtains an image of a flag operator. The at least one neural network is to generates an encoded hand vector based on a configuration of a hand of the traffic director from the image, combines a skeleton of the traffic director generated from the image and the encoded hand vector to generate a representation vector, and predicts a gesture of the traffic director from the representation vector.

14 Claims, 6 Drawing Sheets

(51) Int. Cl.
*B01D 53/26* (2006.01)
*F25D 17/04* (2006.01)
*F25D 25/02* (2006.01)

(56) References Cited

OTHER PUBLICATIONS

Ma, et al, "Traffic command gesture recognition for virtual urban scenes based on a spatiotemporal convolution neural network", ISPRS Intl Journal of Geo-Information, vol. (7), No. (1), Published: Jan. 22, 2018, MDPI, (Basel, Switzerland) 14 Pages.

Wiederer, et al., "Traffic Control Gesture Recognition for Autonomous Vehicles", 2020 IEEE/RSJ International Conference on Intelligent Robots and Systems (IROS), Oct. 25-29, 2020, Las Vegas, NV, USA (Virtual), 8 Pages.

Yan, et al., "Spatial Temporal Graph Convolutional Networks for Skeleton-Based Action Recognition", Proceedings of the Thirty-Second {AAAI} Conference on Artificial Intelligence, . . . New Orleans, Louisiana, USA, Feb. 2-7, 2018, AAAI} Press, 10 Pages.

\* cited by examiner

FLAGMAN TRAFFIC GESTURE RECOGNITION

INTRODUCTION

The subject disclosure relates to operation of an autonomous vehicle, and more specifically to a system and method for recognizing a gesture of a flagman and operating the vehicle according to the gesture.

An autonomous vehicle needs to make safe decisions and facilitate forward progress in the presence of road construction workers and flagmen. A flagman provides temporary traffic control which cannot be determined by referring to a map database or other pre-programmed method. Instead, the commands of the flagman need to be determined in the moment. The need for an immediate response to the flagman means that the meaning of a gesture made by the flagman needs to be determined without substantial latency. Accordingly, it is desirable to be able to recognize gestures from a flagman under different environmental conditions and for different types of flagmen.

SUMMARY

In one exemplary embodiment, a method of operating a vehicle based on a gesture made by a traffic director is disclosed. The method includes inputting an image of the traffic director into at least one neural network, generating, at the at least one neural network, an encoded hand vector based on a configuration of a hand of the traffic director from the image, combining, at the at least one neural network, a skeleton of the traffic director generated from the image and the encoded hand vector to generate a representation vector, predicting, at the at least one neural network, the gesture from the representation vector, and operating the vehicle based on the meaning of the gesture.

In addition to one or more of the features described herein, the method further includes locating a bounding box in the image that indicates a traffic prop being used by the traffic director and determining a classification for the traffic prop. The method further includes generating the representation vector from the skeleton, the bounding box and the encoded hand vector. The method further includes locating the hand in the image from a ray drawn through an elbow key point of the skeleton and a wrist key point of the skeleton. The method further includes obtaining a sequence of images and generating a sequence of representation vectors, each representation vector from the sequence of representation vectors corresponding to a respective image from the sequence of images. In an embodiment, the at least one neural network includes a recurrent neural network in which a current state of the recurrent neural network at a current time step is based on a previous state of the recurrent neural network at a previous time step and the representation vector at the current time step. The method further includes determining the meaning of the gesture using a classification table.

In another exemplary embodiment, a system for operating a vehicle is disclosed. The system includes a camera for obtaining an image of a traffic director and at least one neural network. The at least one neural network is configured to generate an encoded hand vector based on a configuration of a hand of the traffic director from the image, combine a skeleton of the traffic director generated from the image and the encoded hand vector to generate a representation vector, and predict a gesture of the traffic director from the representation vector.

In addition to one or more of the features described herein, the at least one neural network is further configured to generate the skeleton of the traffic director from the image, locate a bounding box in the image that indicates a traffic prop in use by the traffic director and determine a classification for the traffic prop. The at least one neural network is further configured to combine the skeleton, the bounding box and the encoded hand vector to generate the representation vector. A location of the hand of the traffic director in the image is determined from a ray drawn through an elbow key point of the skeleton and a wrist key point of the skeleton. In an embodiment, the image includes a sequence of images, the at least one neural network being further configured to generate a sequence of representation vectors, each representation vector from the sequence of representation vectors corresponding to a respective image from the sequence of images. The at least one neural network further includes a recurrent neural network in which a current state of the recurrent neural network at a current time step is based on a previous state of the recurrent neural network at a previous time step and the representation vector at the current time step. The system further includes a classification table for use in determining the meaning of the gesture.

In yet another exemplary embodiment, a vehicle is disclosed. The vehicle includes a camera for obtaining an image of a traffic director and at least one neural network. The at least one neural network is configured to generate an encoded hand vector based on a configuration of a hand of the traffic director from the image, combine a skeleton of the traffic director and the encoded hand vector to generate a representation vector, and predict a gesture of the traffic director from the representation vector.

In addition to one or more of the features described herein, the at least one neural network is further configured to locate a bounding box in the image that indicates a traffic prop in use by the traffic director. The at least one neural network is further configured to generate the skeleton of the traffic director, locate the bounding box in the image that indicates the traffic prop in use by the traffic director and determine a classification for the traffic prop. A location of the hand of the traffic director in the image is determined from a ray drawn through an elbow key point of the skeleton and a wrist key point of the skeleton. In an embodiment, the image includes a sequence of images, the at least one neural network being further configured to generate a sequence of representation vectors, each representation vector from the sequence of representation vectors corresponding to a respective image from the sequence of images. The at least one neural network further includes a recurrent neural network in which a current state of the recurrent neural network at a current time step is based on a previous state of the recurrent neural network at a previous time step and the representation vector at the current time step.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
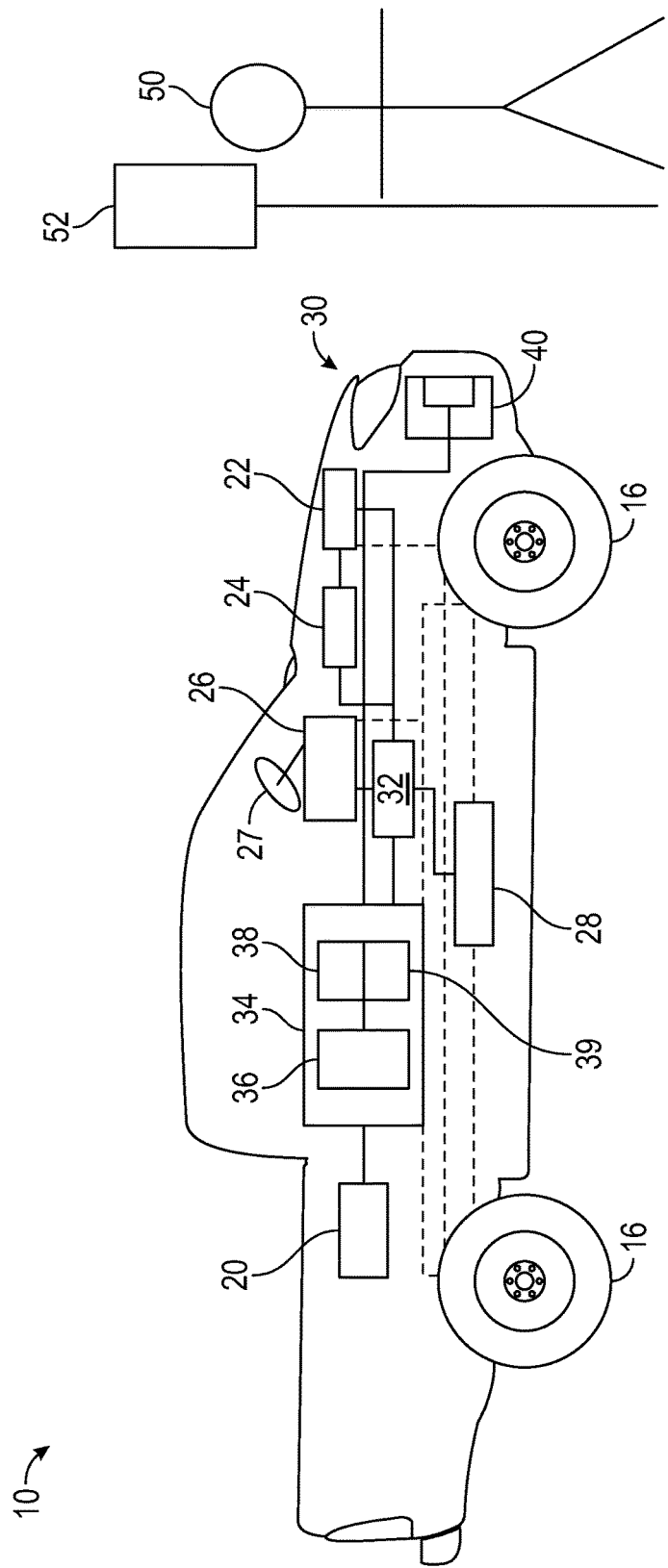
FIG. 1 shows an autonomous vehicle, in an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows an autonomous vehicle 10. In an exemplary embodiment, the autonomous vehicle 10 is a so-called Level Four or Level Five automation system. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver. It is to be understood that the system and methods disclosed herein can also be used with an autonomous vehicle operating at any of Levels One through Five.

The autonomous vehicle 10 generally includes at least a navigation system 20, a propulsion system 22, a transmission system 24, a steering system 26, a brake system 28, a sensor system 30, an actuator system 32, and a controller 34. The navigation system 20 determines a road-level route plan for automated driving of the autonomous vehicle 10. The propulsion system 22 provides power for creating a motive force for the autonomous vehicle 10 and can, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle 10 according to selectable speed ratios. The steering system 26 influences a position of two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

A flagman 50, flag operator, traffic director or person directing traffic is shown relative to the autonomous vehicle 10 and in possession of a traffic prop 52, such as a stop sign, a "slow" sign, a flag, etc. The flagman 50 displays the traffic prop 52 and performs various gestures to indicate a command to either the driver or the autonomous vehicle 10. Illustrative gestures can include an upraised open palm to command the driver to stop or a waving of the arms to have the driver pass through the area.

The sensor system 30 includes a digital camera 40 for capturing an image of the surroundings of the autonomous vehicle 10. In various embodiments, the digital camera 40 can capture an image of the flagman 50 within the field of view of the digital camera. The digital camera 40 can be operated to take multiple images in sequence in order to capture a temporal recording of the flagman 50 and any gesture or movement made by the flagman. The digital camera 40 can be a monocular camera having an array of pixels in an image plane of the digital camera 40 that records the image using a suitable color model, such as a red-green-blue (RGB) color model. In various embodiments, the sensor system 30 can also include a radar system, a Lidar system, etc.

The controller 34 builds a trajectory for the autonomous vehicle 10 or creates an instruction concerning movement of the autonomous vehicle based on the output of the sensor system 30. The controller 34 can provide the trajectory to the actuator system 32 to control the propulsion system 22, transmission system 24, steering system 26, and/or brake system 28 in order to navigate the autonomous vehicle 10 based on an interpretation of a gesture displayed by the flagman 50 and/or a determination of a meaning of the traffic prop 52.

The controller 34 includes a processor 36 and a computer readable storage device or a computer readable storage medium 38. The computer readable storage medium 38 includes programs or instructions 39 that, when executed by the processor 36, operate the autonomous vehicle 10 based on output of the sensor system 30. The computer readable storage medium 38 may further include programs or instructions 39 that when executed by the processor 36 operates one or more neural networks to interpret a gesture of the flagman 50 or to determine a meaning of a traffic prop 52 in order to determine a traffic command being indicated by the flagman. The processor 36 and/or the navigation system 20 receives the determined traffic command and moves or operates the autonomous vehicle 10 in a manner that complies with the flagman's command.

Figure 2:
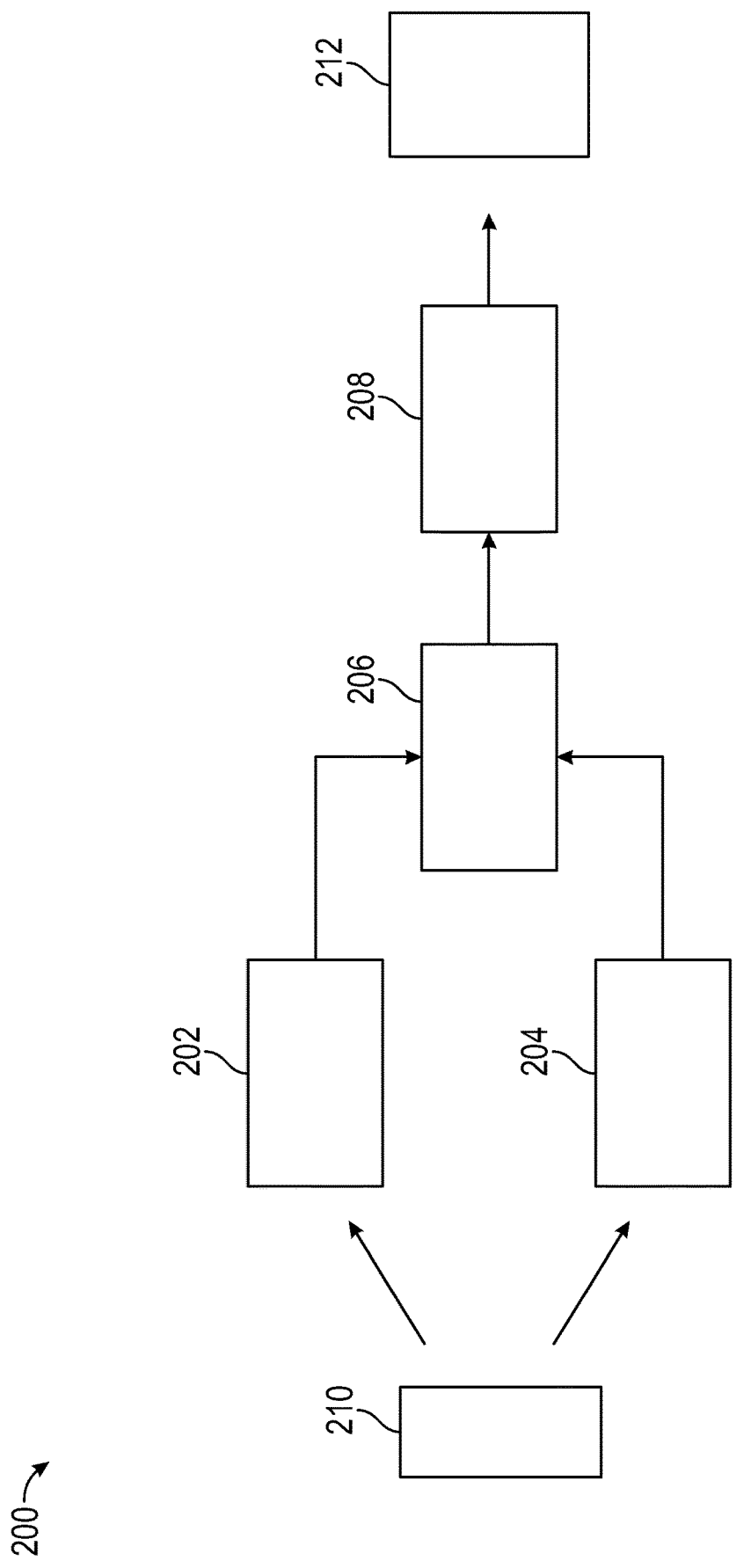
FIG. 2 shows a block diagram of a neural network architecture that is suitable for performing the method disclosed herein for determining a command given by the flagman using an image of the flagman.

FIG. 2 shows a block diagram of a neural network architecture 200 that is suitable for performing the method disclosed herein for determining a command given by the flagman 50 using an image of the flagman. The neural network architecture 200 can be operated on the processor 36 or any other suitable component of the autonomous vehicle 10. The neural network architecture 200 can include a single neural network including separate neural network modules for performing different operations. Alternatively, the neural network architecture 200 can include a plurality of neural networks, each neural network being dedicated to performing a single operation. In further embodiments, the neural network architecture 200 can include a plurality of neural networks, with at least one neural network performing multiple operations. As illustrated in FIG. 2, the neural network architecture 200 includes four neural networks modules. A first neural network module 202 receives an image 210 of the flagman 50 and outputs a first set of data for the flagman. The first set of data includes a skeleton or skeletal representation of the flagman and a bounding box and prop category or prop classification for a traffic prop 52 being used by the flagman. When the flagman is not using a traffic prop 52, the first set of data can include the skeleton without a bounding box or prop classification. When the flagman 50 is holding a traffic prop 52, the first neural network module 202 can establish the bounding box in the image 210 around the traffic prop. In various embodiments, the skeleton data can be obtained using a suitable device or machine other than a neural network or neural network module. A second neural network module 204 receives cropped images formed from the image 210. The cropped images include a right hand cropped image and a left hand cropped image formed around the respective hands of the flagman 50. The cropped images are input to the second neural network module 204, which outputs a second set of data that includes an encoded hand vector.

The third neural network module 206 combines the first set of data (i.e., the skeleton with or without the bounding box) with the second set of data (i.e., the encoded hand vector) into a representation vector for the flagman 50. The representation vector is provided to a fourth neural network module 208 that interprets the command of the flagman from the representation vector. The fourth neural network module 208 is discussed in detailed with respect to FIG. 6.

Figure 3:
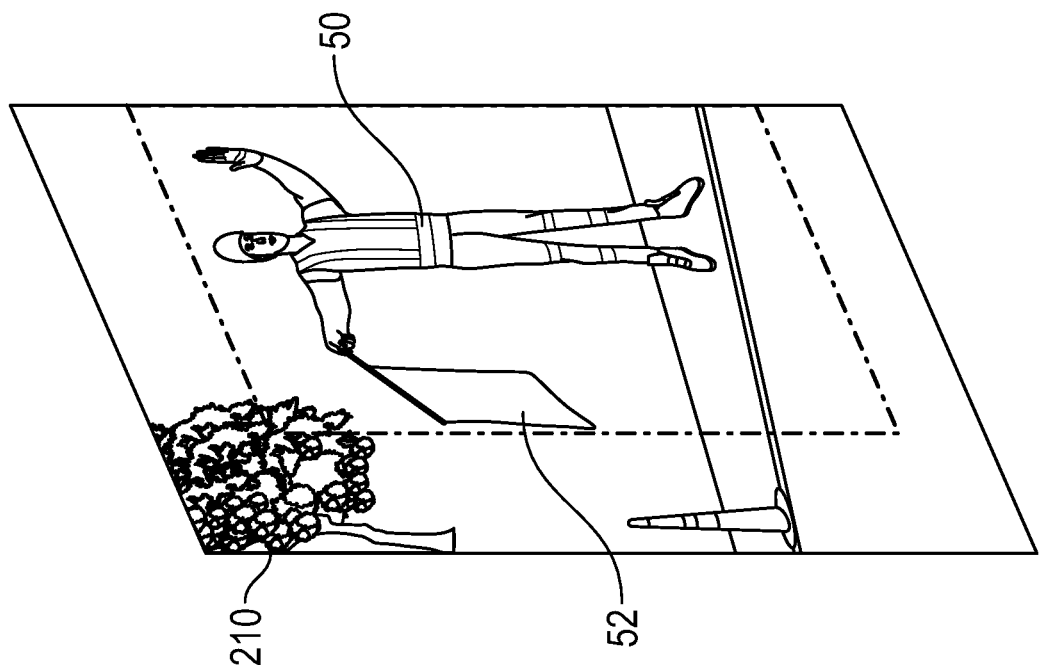
FIG. 3 shows an image obtained from the digital camera of the autonomous vehicle, in an illustrative embodiment.

FIG. 3 shows an image 210 obtained from the digital camera 40 of the autonomous vehicle 10, in an illustrative embodiment. The image 210 includes the flagman 50 and a traffic prop 52 that is being displayed by the flagman. The image 210 is a digital image stored using an array of pixels associated with the digital camera 40. Each pixel of the array is characterized by an (x, y) coordinate within the array and a color value indicated by a suitable color model, such as an RGB color model.

Figure 4:
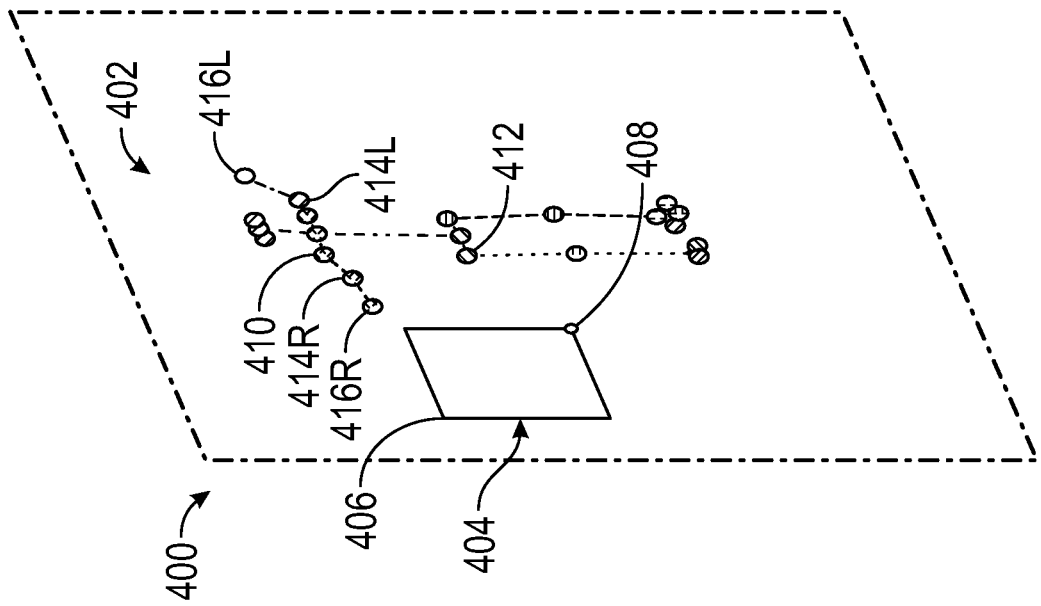
FIG. 4 shows an illustrative output of a first neural network module of the neural network architecture based on the image.

FIG. 4 shows an illustrative representation 400 of the first set of data output by the first neural network module 202 based on the image 210. The illustrative representation 400 includes a skeletal representation or skeleton 402 of the flagman 50 and a bounding box 404 surrounding a location of the traffic prop 52. The skeleton 402 includes a plurality of key points, each key point representing a location of a joint of the flagman 50 (such as shoulder 410 and hip 412). Each key point can be represented as an (x,y) coordinate within the image 210. By recording only the (x,y) coordinates of the skeleton 402, any variation in the appearance of different flagmen, such as height, build, etc., can be removed or discounted. The use of the skeleton 402 reduces the impact such variations can have on determining a gesture of the flagman 50. In addition, recording only the (x,y) coordinates significantly reduces the information in the image 210 to a small set of data, which reduces computation time. A value indicating a detection confidence is also recorded for each recorded key point.

The bounding box 404 is placed or located about the estimated location of the prop by the first neural network module 202. The bounding box 404 can be recorded using the coordinates of two corners of the bounding box, such as a first corner 406 that is a top-left corner of the bounding box and a second corner 408 that is a bottom-right corner of the bounding box. The first neural network module 202 can determine a prop class (stop sign, flag, etc.) and detection score for the bounding box 404. If no prop is detected, the detection score is set to zero. In other embodiments, the bounding box 404 can be recorded using other suitable parameters.

Figure 5:
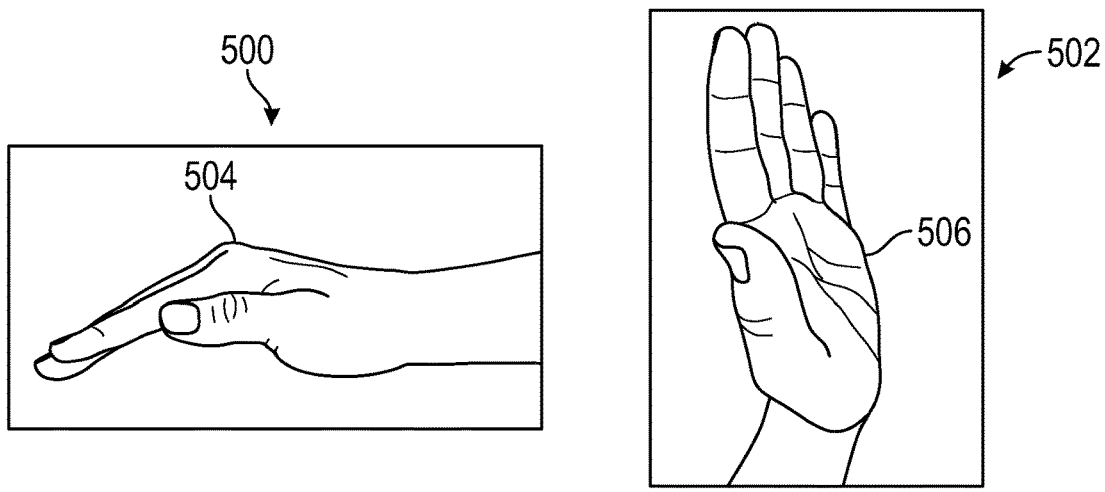
FIG. 5 shows a right hand cropped image and a left hand cropped image obtained from the image of the flagman.

FIG. 5 shows a right hand cropped image 500 and a left hand cropped image 502 obtained from the image 210 of the flagman 50. The right hand cropped image 500 shows a snapshot of the right hand 504 of the flagman 50 and the left hand cropped image 502 shows a snapshot of a gesture of the left hand 506 of the flagman 50. Each hand can be located using selected key points from the skeleton 402. In one embodiment, a right elbow key point 414R and a right wrist key point 416R (FIG. 4) are located and a ray is drawn extending from the right elbow key point 414R through the right wrist key point 416R to locate the right hand 504. Additionally, the left elbow key point 414L and the left wrist key point 416L are located and a ray is drawn extending from the left elbow key point 414L through the left wrist key point 416L to locate the left hand 506. The right hand cropped image 500 and the left hand cropped image 502 are input to the second neural network module 204, which outputs the encoded hand vector.

Figure 6:
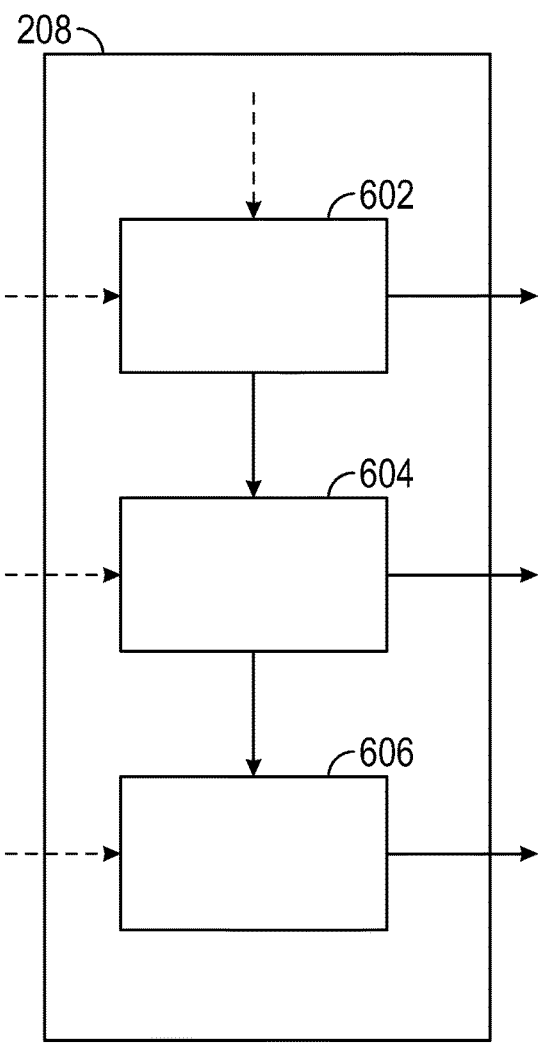
FIG. 6 shows a schematic diagram illustrating operation of a fourth neural network module of the neural network architecture.
Figure 8:
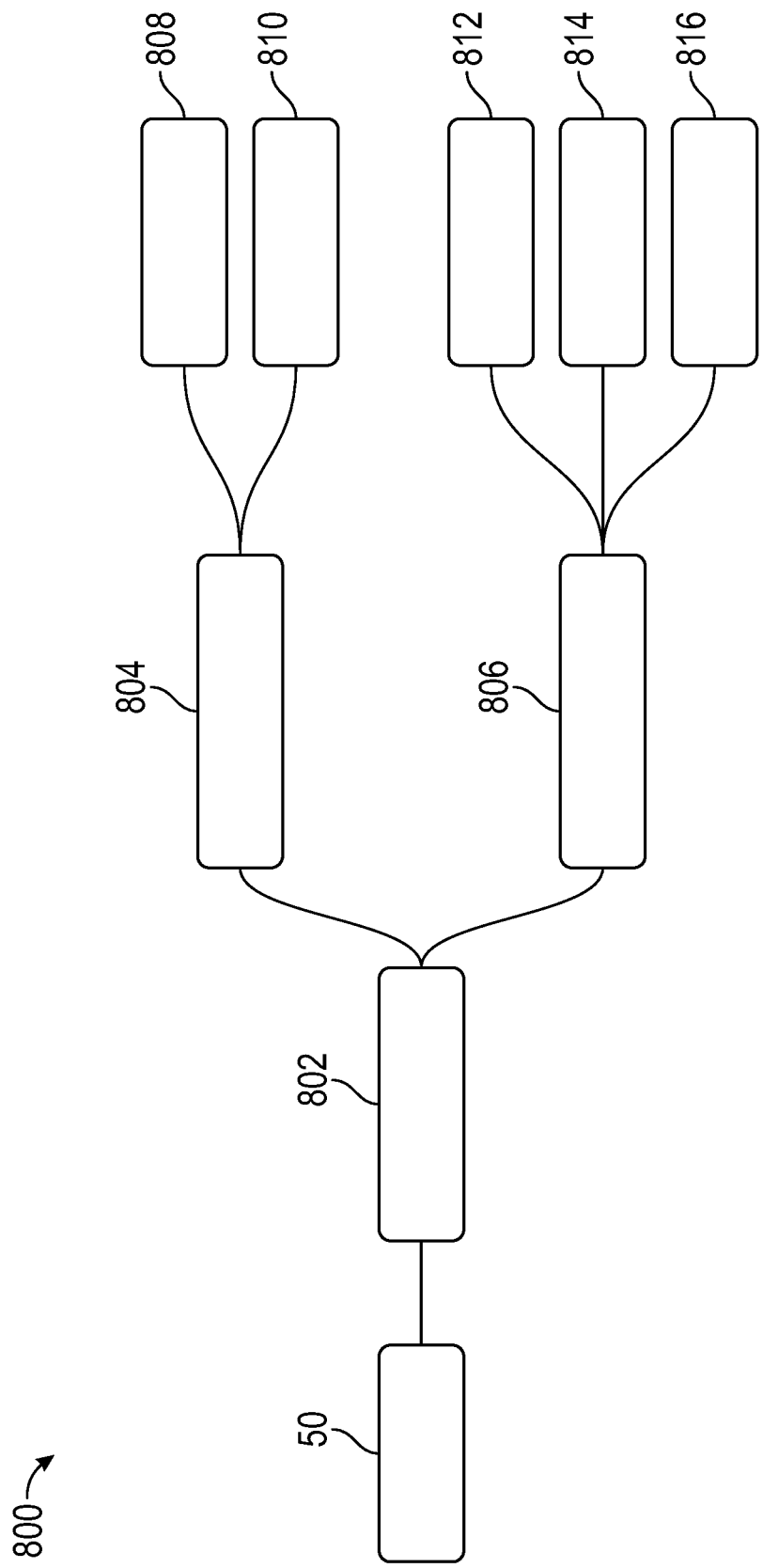
FIG. 8 shows an illustrative classification table suitable for recognizing the meaning of a gesture of a flagman in various situations.

FIG. 6 shows a schematic diagram illustrating operation of the fourth neural network module 208. In various embodiments, the fourth neural network module 208 is a recurrent neural network, such as a long short-term memory (LSTM) neural network. The LSTM operates using history-encoded state variables. The LSTM receives representation vectors ( . . . , $SV_{(t+1)}$, $SV_t$, $SV_{(t-1)}$, . . . ) from the third neural network on a continuous basis over a plurality of time steps, receiving a representation vector at each time step. The LSTM changes its state at each time step based on the input. Three state are shown for illustrative purposes: the $(t-1)^{th}$ state 602 ($LSTM_{(t+1)}$, the $t^{th}$ state 604 ($LSTM_t$) and the $(t+1)^{th}$ state 606 ($LSTM_{(t+1)}$). The state of the LSTM at a selected time step is based on the representation vector received at the selected time step and the state of the LSTM at the previous time step. Thus, the $LSTM_t$ state (at time step t) is based on the $LSTM_{(t-1)}$ state and the representation vector $SV_t$. Similarly, the $LSTM_{(t+1)}$ state is based on the $LSTM_t$ state and the representation vector $SV_{t+1}$. The network learns to correlate past frames with the probability of a gesture to occurs. The LSTM network therefore learns to correlate a representation vector with a prior state of the LSTM to predict the gesture being made by the flagman. The prediction is used to determine a meaning of the gesture. The meaning can be determined using a classification table, such as shown in FIG. 8. The recurrent neural network has a low latency in its output and can therefore predict a gesture substantially immediately.

When a sequence of images is taken by the digital camera 40, the first neural network module 202, second neural network module 204 and third neural network module 206 generate a sequence of representation vectors, with each representation vector being based on a respective image of the sequence of images. The sequence of representation vectors is provided to the fourth neural network module 208 to interpret a gesture from the sequence. The fourth neural network module 208 changes its state with each representation vector and predicts the gesture 212 of the flagman 50 from the sequence of representation vectors.

Figure 7:
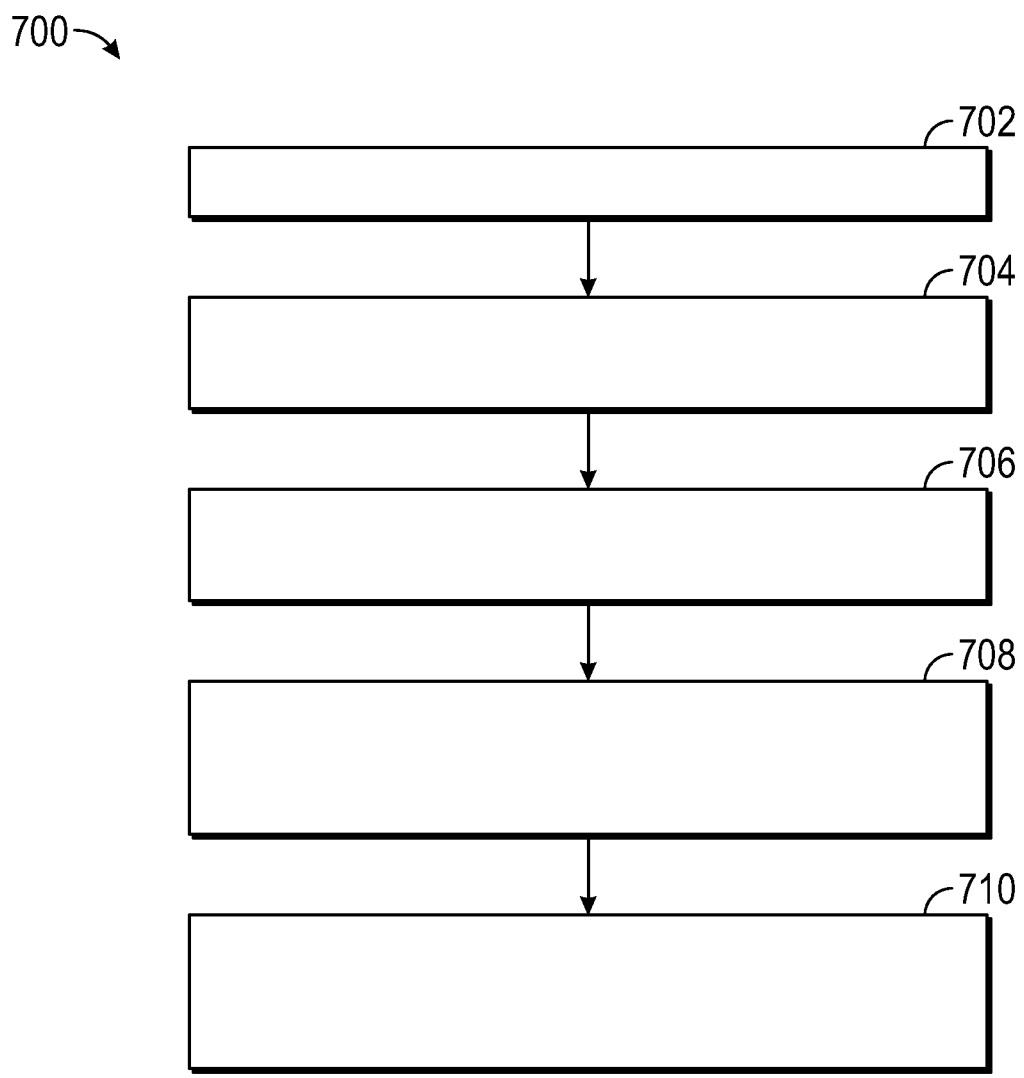
FIG. 7 shows a flowchart illustrating a method for operating an autonomous vehicle in response to a command or gesture indicated by a flagman.

FIG. 7 shows a flowchart 700 illustrating a method for operating an autonomous vehicle 10 in response to a command or gesture indicated by a flagman 50. In box 702, an image is captured by the digital camera that includes the flagman. The image can also include a traffic prop being used by the flagman. In box 704, a skeleton of the flagman is generated from the image and a bounding box is located around a traffic prop being used by the flagman. The skeleton and bounding box (i.e., the first set of data) can be generated by inputting the image into a first neural network. In box 706, a hand representation vector is formed from the hands of the flagman. The image is cropped to form a right hand cropped image and a left hand cropped image. These cropped images are input to a second neural network, which outputs the hand representation vector (i.e., the second set of data). In box 708, the skeleton and bounding box and the hand representation vector are input into a third neural network which combines them to generate a representation vector of the flagman. In box 710, representation vector is input into a recurrent neural network (the fourth neural network) which determines the meaning of the gesture or a command indicated by the gesture. The autonomous vehicle can then be navigated based on the meaning or command.

FIG. 8 shows an illustrative classification table 800 suitable for recognizing the meaning of a gesture of a flagman 50 in various situations. The illustrative classification table 800 includes a semantics class 802 used to determine a meaning of the gesture, such as whether the gesture is a non-directional gesture 804 or directional gesture 806. A non-directional gesture 804 can include a command to stop 808 or a command to slow down 810. A directional gesture 806 can include a command to turn 812, a command to move forward 814, a command to take a selected route 816, etc.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of operating a vehicle based on a gesture made by a traffic director, comprising:
    inputting an image of the traffic director into at least one neural network, wherein the traffic director is using a traffic prop;
    generating a skeleton of the traffic direction from the image;
    locating a hand of the traffic director in the image from a ray drawn through an elbow key point of the skeleton and a wrist key point of the skeleton;
    locating a bounding box in the image that indicates the traffic prop;
    generating, at the at least one neural network, an encoded hand vector based on a configuration of the hand of the traffic director from the image;
    combining, at the at least one neural network, the skeleton of the traffic director in the bounding box, and the encoded hand vector to generate a representation vector;
    predicting, at the at least one neural network, the gesture from the representation vector; and
    operating the vehicle based on the meaning of the gesture.

2. The method of claim 1, further comprising determining a classification for the traffic prop.

3. The method of claim 1, further comprising obtaining a sequence of images and generating a sequence of representation vectors, each representation vector from the sequence of representation vectors corresponding to a respective image from the sequence of images.

4. The method of claim 3, wherein the at least one neural network includes a recurrent neural network in which a current state of the recurrent neural network at a current time step is based on a previous state of the recurrent neural network at a previous time step and the representation vector at the current time step.

5. The method of claim 1, further comprising determining the meaning of the gesture using a classification table.

6. A system for operating a vehicle, comprising:
    a camera for obtaining an image of a traffic director, wherein the traffic director is using a traffic prop; and
    at least one neural network configured to:
        generate a skeleton of the traffic direction from the image;
        determine a location of a hand of the traffic director in the image from a ray drawn through an elbow key point of the skeleton and a wrist key point of the skeleton;
        locate a bounding box in the image that indicates the traffic prop;
        generate an encoded hand vector based on a configuration of a hand of the traffic director from the image;
        combine a skeleton of the traffic director generated from the image and the encoded hand vector to generate a representation vector; and
        predict a gesture of the traffic director from the representation vector.

7. The system of claim 6, wherein the at least one neural network is further configured to determine a classification for the traffic prop.

8. The system of claim 6, wherein the image includes a sequence of images, the at least one neural network being further configured to generate a sequence of representation vectors, each representation vector from the sequence of representation vectors corresponding to a respective image from the sequence of images.

9. The system of claim 8, wherein the at least one neural network further comprises a recurrent neural network in which a current state of the recurrent neural network at a current time step is based on a previous state of the recurrent neural network at a previous time step and the representation vector at the current time step.

10. The system of claim 6, further comprising a classification table for use in determining the meaning of the gesture.

11. A vehicle, comprising:
    a camera for obtaining an image of a traffic director, wherein the traffic director is using a traffic prop; and
    at least one neural network configured to:
        generate a skeleton of the traffic direction from the image;
        determine a location of a hand of the traffic director in the image from a ray drawn through an elbow key point of the skeleton and a wrist key point of the skeleton;
        locate a bounding box in the image that indicates the traffic prop;
        generate an encoded hand vector based on a configuration of a hand of the traffic director from the image;
        combine a skeleton of the traffic director and the encoded hand vector to generate a representation vector; and
        predict a gesture of the traffic director from the representation vector.

12. The vehicle of claim 11, wherein the at least one neural network is further configured to determine a classification for the traffic prop.

13. The vehicle of claim 11, wherein the image includes a sequence of images, the at least one neural network being further configured to generate a sequence of representation vectors, each representation vector from the sequence of representation vectors corresponding to a respective image from the sequence of images.

14. The vehicle of claim 13, wherein the at least one neural network further comprises a recurrent neural network in which a current state of the recurrent neural network at a current time step is based on a previous state of the recurrent neural network at a previous time step and the representation vector at the current time step.

\* \* \* \* \*